United States Patent [19]
Cho

[11] Patent Number: 5,717,260
[45] Date of Patent: Feb. 10, 1998

[54] ROTOR FOR A CYLINDRICAL LINEAR MOTOR

[75] Inventor: Kil Hee Cho, Changwon, Rep. of Korea

[73] Assignee: LG Industrial Systems Co., Ltd., Seoul, Rep. of Korea

[21] Appl. No.: 368,013

[22] Filed: Jan. 3, 1995

[30] Foreign Application Priority Data

Jan. 20, 1994 [KR] Rep. of Korea ............... 1044/1994

[51] Int. Cl.$^6$ ............................................. H02K 41/00
[52] U.S. Cl. ............................................. 310/12
[58] Field of Search .................... 310/12, 13, 14, 310/15, 27, 194

[56] References Cited

U.S. PATENT DOCUMENTS

| | | |
|---|---|---|
| 4,219,752 | 8/1980 | Katou ............................. 310/156 |
| 4,281,263 | 7/1981 | Virolleau et al. ............... 310/13 |
| 4,945,269 | 7/1990 | Kamm ............................ 310/15 |
| 5,315,190 | 5/1994 | Nasar ............................. 310/12 |

*Primary Examiner*—Clayton E. Laballe
*Assistant Examiner*—Jonathan Link
*Attorney, Agent, or Firm*—Oliff & Berridge, P.L.C.

[57] ABSTRACT

An improved rotor construction of a cylindrical linear motor capable of more correctly adjusting locations of the core groups and coils of the rotor and correctly affixing the core groups and the coils thereof using support plates which includes a plurality of core groups, disposed at a predetermined angle from each other and each having a plurality of teeth and a plurality of grooves formed therein; a plurality of disk type coils respectively inserted into the grooves; support plates disposed between the core groups; a first motor cover affixed at one end of the core groups and a second motor cover affixed at the other end of the core groups.

3 Claims, 3 Drawing Sheets

ROTOR FOR A CYLINDRICAL LINEAR MOTOR

BACKGROUND OF THE INVENTION

1. Field of the Invention

The present invention relates to a rotor for a cylindrical linear motor, and particularly to an improved rotor for a cylindrical linear motor capable of more correctly adjusting locations of a core group and a coil of the rotor of the cylindrical linear motor and correctly affixing the core group and the coil thereof to each other using a support plate.

2. Description of the Conventional Art

Referring to FIGS. 1 to 3, them is shown a partial portion of a rotor 1 of a conventional linear motor, which includes a plurality of core groups 2 longitudinally disposed at predetermined portions of the rotor 1. Here, the core groups 2 are disposed with an installation angle of 90° therebetween. A predetermined space(not shown) is defined at a central portion of the rotor where the bottom portions of each core group 1 face each other and through which a stator(not shown) is inserted. In addition, a plurality of teeth 3 having a predetermined width and depth are longitudinally formed on the lower side of each core group 2. A plurality of grooves 4 having a predetermined width and depth are formed between the teeth 3. Here, coils 5 which generate a magnetic force in electrical cooperation with the core group 2 are inserted into each of the grooves 4. Here also, a predetermined number of teeth 4 are cut away to allow the coil 5 to be inserted thereinto, so that the core groups 2 and the coils 5 are cooperatively affixed with each other thereby.

Meanwhile, a clip 7 is disposed around an outer circumferential portion of the core group so that the disk type support core 6 and the core group 2 are tightened by the clip 7. Each end portion of the clip 7 is angled by a predetermined length, the both ends of which angled portions are respectively extended toward the upper surface of the disk type support core 6. Here, on each end of the clip 7 is placed an affixing member 9 carrying an affixing bolt 8. In addition, a support plate 10 having an angled portion at an intermediate portion thereof is disposed between the dip 7 and each affixing member 9. In such a state, when the affixing bolt 8 is tightened, while pressing the affixing member 9 and the support plate 10, the clip 7 presses the core group 2 more tightly and eccentrically, so that the core group 2 and the coil 5 are tightly affixed thereby.

FIG. 2A shows in detail a rotor 1 separate from the core group 2 and FIG. 2B shows a side view of the core group 2. As shown therein, there are formed the plurality of grooves 4 by cutting away a predetermined number of teeth 3 formed on the core group 2, and then the disk type support cores 6 are inserted into the grooves 4.

Referring to FIG. 3, the clip 7 surrounds the outer circumferential surface of the core group 2. Both ends of the clip 7 are affixedly pressed by the support plate 10. Here, each of the support plates 10 is affixedly pressed by the affixing members 9, respectively.

The detailed construction of the rotor of the cylindrical linear motor according to the conventional art will now be explained.

To begin with, a predetermined number of the teeth 3 are cut away for forming a plurality of grooves 4 and then a predetermined number of the disk type support cores 6 are inserted into each of the grooves 5. Thereafter, the dip 7 having a predetermined elastic property is surroundingly disposed onto the outer circumferential surface of the core group 2. The both ends of the clip 7 are affixed by the support plates 10 and the upper surface of each support plate 10 is in contact with the bottom surface of an affixing member 9 carrying an affixing bolt 8 thereon. Here, upon tightening the bolts 8, the clip 7 eccentrically presses the outer circumferential surface of the core group 2, so that the core group 2 and the coil 5 are tightly affixed with each other.

However, in order to correctly locate and affix the core group 2 and the coil 5, respectively, a plurality of teeth 3 which are formed on the core group 2 should be cut away, so that a predetermined length which is the same length as the width of the teeth cut away to dispose the coil therein should further be extended at the end of the core group 2 for generating a predetermined magnetic force requiting a predetermined number of cores 5 and thus the total length of the core group 2 becomes longer, disadvantageously requiring the products of the rotor of the cylindrical linear motor to have large size. In addition, as the length of the rotor increases, the core group 2 might become longitudinally twisted, so that there might be undesired gaps between the inner circumferential surface of the rotor and the outer circumferential surface of the stator(not shown) and thus the rotor of the cylindrical linear motor might cause troubles in use.

SUMMARY OF THE INVENTION

It is an object of the present invention to provide a rotor for a cylindrical linear motor having an improved construction.

It is another object of the present invention to provide an improved rotor for a cylindrical linear motor capable of more correctly adjusting locations of the core group and coil of the rotor of the cylindrical linear motor and correctly affixing the core group and the coil thereof using a support plate.

To achieve the above objects, there is provided a rotor for a cylindrical linear motor which includes a rotor; a plurality of core groups, disposed at a predetermined portion of the cylindrical linear motor, having a plurality of teeth and a plurality of grooves thereon; a plurality of disk type coils respectively inserted into the grooves; a support plate disposed between core groups; and a first motor cover affixed at one end of the rotor thereof and a second motor cover affixed at the other end of the rotor thereof.

DETAILED DESCRIPTION OF THE INVENTION

Figure 1:
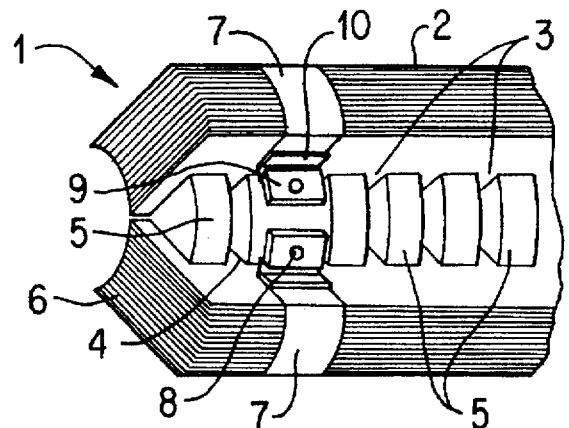
FIG. 1 is a perspective view showing a partially cut rotor of a conventional cylindrical linear motor.
Figure 2A:
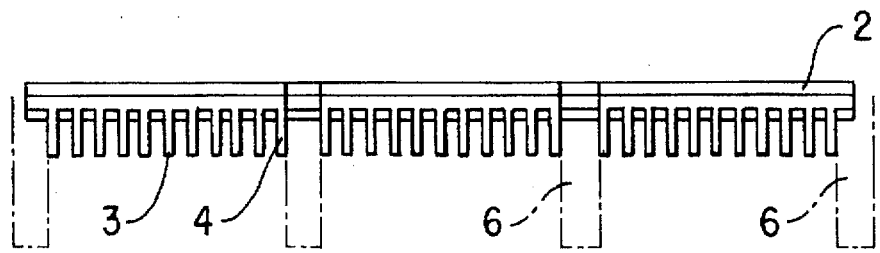
FIG. 2A is a side view showing a core group of the rotor of the conventional cylindrical linear motor.
Figure 2B:
FIG. 2B is an end view showing a core group of the rotor of the conventional cylindrical linear motor shown in FIG. 2A.
Figure 3:
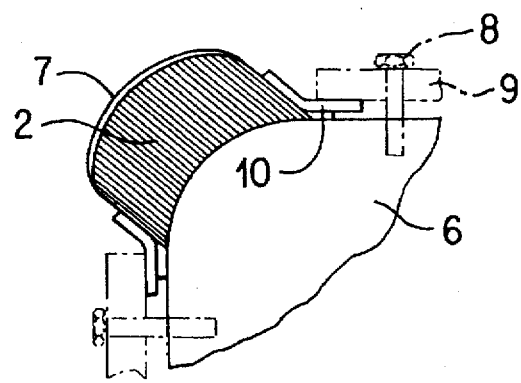
FIG. 3 is a partial end view showing a coupled core group and a support core of the conventional linear motor.

The structure of a rotor of a cylindrical linear motor according to a fast embodiment of the present invention will now be explained with reference to FIGS. 4 to 6.

To begin with, as shown therein, the rotor 100 includes four core groups 110 longitudinally disposed therein and having installation angles of 90° therebetween. A plurality of grooves 110a and a plurality of teeth 110b are respectively formed along the lower portion of each core group 110. A plurality of disk type coils 120 are respectively inserted into the grooves 110. In order to determine the installation locations of the core groups 110 and the disk type coils 120 and to affix them, respectively, support plates 130 each carrying a plurality of affixing bolts 140 are disposed between the core groups 110. A detailed description of the support plates 130 will be provided below with reference to FIG. 5.

In addition, a first motor cover 150 is affixed to one end of the rotor 100 by a plurality of affixing bolts 150a, and a second motor cover 160 is affixed to the other end of the rotor by a plurality of affixing bolts 160a. A plurality of guiding grooves 170 are formed at inner sides of both the first motor cover 150 and the second motor cover 160 for receiving therein partially extended end portions of each end of the core groups 110, respectively. A stator hole 180 for receiving the longitudinal stator(not shown) therethrough is centrally formed in each of the first and second motor covers 150, 160 where the end surfaces of each of the four core groups 110 intersect with each other.

Figure 4:
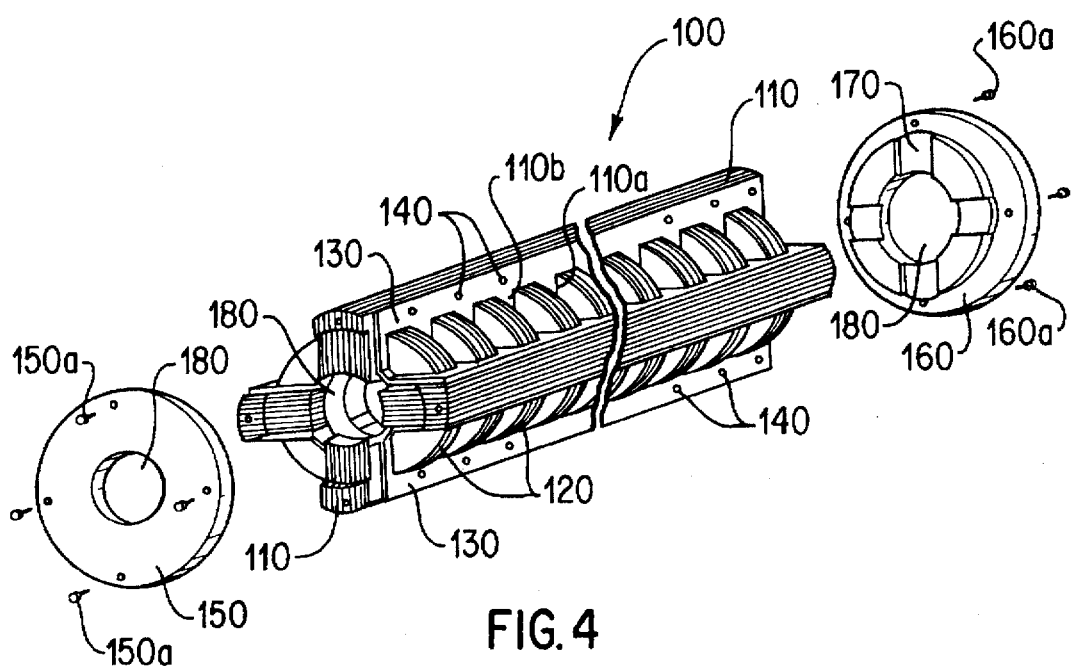
FIG. 4 is a perspective view showing the complete structure of a rotor of a cylindrical linear motor according to a first embodiment of the present invention.
Figure 5:
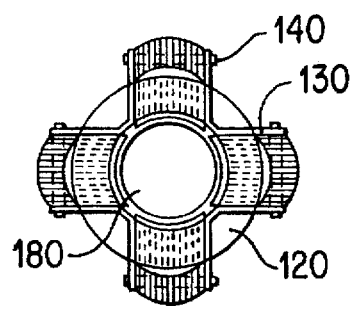
FIG. 5 is an end view showing the rotor of the cylindrical linear motor of the first embodiment shown in FIG. 4.

FIG. 5 shows an end side view of the core groups 110 shown in FIG. 4.

As shown therein, the support plates 130 are disposed between the core groups 110 affixed to the core groups 110 by the affixing bolts 140.

Figure 6:
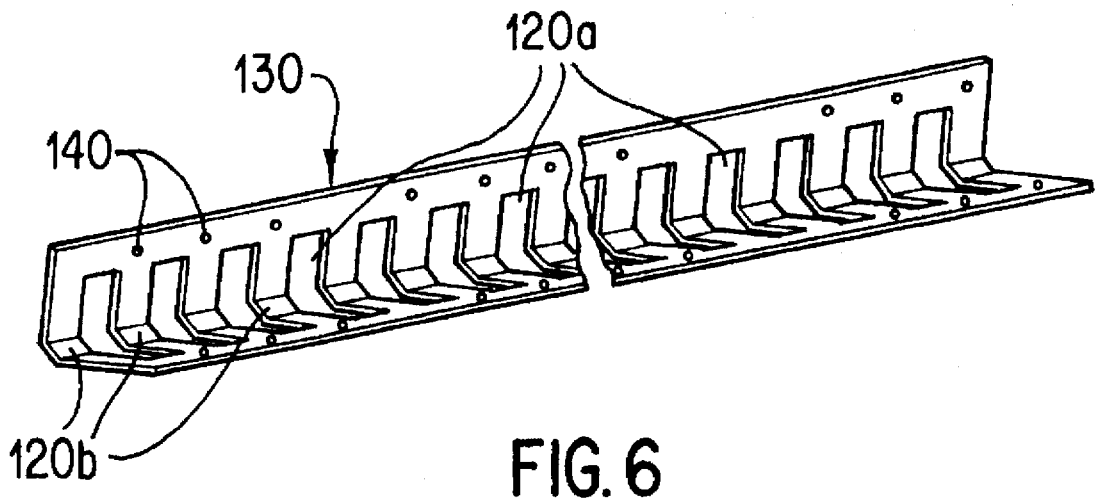
FIG. 6 is a perspective view showing a support plate of the rotor of the cylindrical linear motor according to the present invention.

FIG. 6 shows a perspective view of one of the support plates 130 for affixedly supporting the core groups 110 and the coils 120.

As shown therein, the longitudinal support plate 130 is inwardly angled and includes a plurality of grooves 120a which are formed at a predetermined intervals one after another for partially receiving the coils 120 therethrough, a recessed portion 120b at the inwardly angled portion thereof for avoiding interference with the corner portions of the core groups 110, and a plurality of affixing holes for accepting the bolts 140 affixing the support plate 130 to the core group 110.

The construction of the rotor of the cylindrical linear motor according to a first embodiment of the present invention will now be explained with reference to FIGS. 4 to 6.

To begin with, a coil 120 is inserted into each of the respective grooves 110a formed in the core groups 110. At this time, four core groups 110 are disposed to have 90° installation angles therebetween. A part of the coil 120 is inserted into the groove 110a of the support plate 130 and then the support plates 130 are affixed to the core groups 110 by the plurality of affixing bolts 140. The first motor cover 150 is affixed to one end of the core groups 110 and the second motor cover 160 is affixed to the other end of the core groups 110. At this time, the protruding portion of one end of the core groups 110 is inserted into the guide grooves 170 of the first motor cover 150. In addition, the protruding portion of the other end of the core groups 110 is inserted into the guiding grooves 170 of the second motor cover 160.

Figure 7:
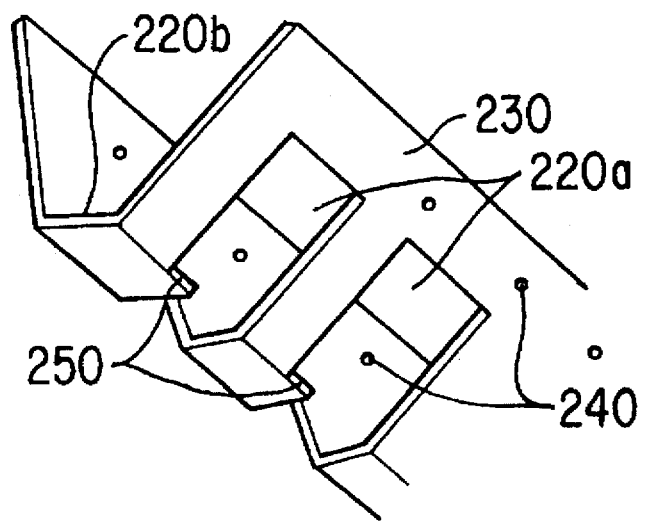
FIG. 7 is a perspective view showing a support plate of a rotor of a cylindrical linear motor according to a second embodiment of the present invention.

Meanwhile FIG. 7 shows a partially cut-off support plate of the rotor of the cylindrical linear motor according to a second embodiment of the present invention.

The elements of this second embodiment except for the support plate are the same as in the fast embodiment of the present invention, so the descriptions thereof are excluded.

As shown therein, the inwardly angled longitudinal support plate 230 includes a plurality of grooves 220a which are formed at predetermined intervals one after another for partially receiving the coils 120 therethrough, a recessed portion 220b at the angled portion thereof for avoiding interference with the corner portions of the core groups 110, and a plurality of affixing holes for the bolts 140 affixing the support plates 230 to the core groups 110. In addition, a protrusion 250 is formed at an extended portion of each recessed portion 220b of the support plate 230, which provision 250 is affixed to a predetermined portion of the coil 120, so that the support plate 230 is more rigidly affixed to the coil 120.

The effects of the fast and second embodiments of the rotor construction for a cylindrical linear motor according to the present invention will now be explained.

In order to determine the location of the core groups and the coils and to more rigidly affix them with each other, by providing the support plate according to the present invention, it becomes no longer required to cut away the teeth formed in the core group, so that the core group can be made shorter than the conventional rotor's core group and not be subject to longitudinal twisting and thus the rotor construction according to the present invention economically and advantageously improves over the conventional rotor construction.

In addition, by inserting each of the coils into corresponding grooves, the location of the installation can accurately and advantageously be secured, so that a more safe operation of the cylindrical linear motor can be obtained.

What is claimed is:

1. A rotor for a cylindrical linear motor, the rotor having a longitudinal axis and comprising:

a plurality of core groups, each disposed at a first angle with respect to one another and each having a plurality of teeth and a plurality of grooves formed thereon;

disk type coils respectively inserted into each of the grooves;

support plate means disposed between each of said core groups and being bent at a second angle; and a first motor cover affixed at one end of said core groups and a second motor cover affixed at the other end of said core groups, wherein said support plate means includes a plurality of openings for receiving said coils therein such that an outer periphery in a radial direction of each of said coils is located between the support plate means at one of the openings and the longitudinal axis of the rotor, and wherein said support plate means includes recess means at an inwardly angled portion thereof.

2. The rotor of claim 1, wherein said support plate means includes a plurality of affixing bolts for affixing the support plate means to the core groups.

3. The motor of claim 1, wherein said support plate means includes a protrusion, affixed to a predetermined portion of the coil, which is extendedely formed from one portion of the recess means.

\* \* \* \* \*